US005497193A

United States Patent [19]
Mitsuhashi et al.

[11] Patent Number: 5,497,193
[45] Date of Patent: Mar. 5, 1996

[54] ELECTRONIC STILL CAMERA WITH DUAL CONTACT SHUTTER SWITCH FOR PICTURE REVIEW

[75] Inventors: Syoji Mitsuhashi; Satoru Gozu, both of Kanagawa, Japan

[73] Assignee: Sony Corporation, Tokyo, Japan

[21] Appl. No.: 144,809

[22] Filed: Oct. 28, 1993

[30]  Foreign Application Priority Data

Oct. 29, 1992 [JP] Japan ..................... 4-314120

[51] Int. Cl.$^6$ .................................. H04N 5/225
[52] U.S. Cl. .................. 348/231; 348/333; 358/906
[58] Field of Search .................... 348/207, 231, 348/333; 358/906

[56] References Cited

U.S. PATENT DOCUMENTS 4,837,628  6/1989 Sasaki .................... 348/333 X
4,887,161 12/1989 Watanabe et al. ................. 348/333 X
5,162,915 11/1992 Idera et al. ........................ 348/33 X
5,274,458 12/1993 Kondo et al. ..................... 358/906 X Primary Examiner—Wendy R. Greening
Attorney, Agent, or Firm—Limbach & Limbach

[57] ABSTRACT

While the EE mode is set to continuously display a picture signal on a display unit, (a) a control unit energizes a shutter and a picture data recording and reproducing unit to take a still picture of an object and record the picture data on a memory in the picture data recording and reproducing unit, when a second contact of a shutter button is energized, and (b) the control unit energizes a switching circuit and the picture data recording and reproducing unit to reproduce the picture data recorded in the memory and display it on the display unit, when a first contact of the shutter button is energized and the energization is continued for a predetermined time.

13 Claims, 2 Drawing Sheets

ELECTRONIC STILL CAMERA WITH DUAL CONTACT SHUTTER SWITCH FOR PICTURE REVIEW

BACKGROUND OF THE INVENTION

1. Field of the Invention

The present invention relates to a camera, more particularly an electronic still camera which is easy to operate.

2. Description of the Related Art

An electronic still camera is comprised of an imaging device such as a charge coupled device (CDD), an optical system including lenses and a stop for forming an image of an object on the imaging device, a first storage unit for storing raw image data, a shutter unit, a secondary storage unit recording the picture data on a portable and detachable memory medium such as a memory card or an IC card provided with a memory, and a display unit such as a liquid crystal display (LCD) for showing the information input to the imaging device and the image data recorded in the first storage unit and/or the memory medium. An electronic still camera is designed to take and record still pictures.

An explanation will first be given of the EE mode (electric-electric mode) wherein the image of an object formed on the imaging device is shown as it is on the display unit. The image of the object formed on the imaging device through the optical system is converted into electrical signals and shown directly on the display unit. Pictures on the display unit in the EE mode are shown successively in short time periods, so are perceived by the user to be moving pictures. The picture on the display unit in this EE mode is called an EE picture. When using the electronic still camera to take a picture, the user decides on the composition of the object and then pushes the shutter. The image formed on the imaging device when the shutter is pushed is successively recorded in the memory medium by the secondary storage unit.

Next, an explanation will be made of a reproduction mode wherein the image data recorded in the memory medium by the secondary recording unit is displayed on the display unit. The user sets the electronic still camera to the reproduction mode and then designates the image to be reproduced. As a result of this operation, the electronic still camera reads out the designated image data from the memory medium through the secondary storage unit and shows it on the display unit. The picture in this reproduction mode is called the "reproduced picture". The reproduced picture is shown one frame at a time on the display unit and therefore is a still picture.

The user takes a picture of an object while viewing the image in the EE mode and then examines the reproduced picture to confirm the image recorded in the memory medium loaded in the secondary storage unit. As a result, there are the following disadvantages in the image display in conventional electronic still cameras.

The image taken by the EE mode is used to decide on the composition of the shot and to take the picture. To check the image recorded in the memory medium loaded in the secondary storage unit as a result of this shot, it is necessary to set the electronic still camera once to the reproduction mode and then designate the image to be reproduced. Therefore, even when checking the image taken just before, it is necessary to set the electronic still camera from the EE mode to the reproduction mode each time desiring to check the picture and to designate the image desired to be confirmed, making the operation troublesome. Further, when desiring to resume taking pictures once again after the confirmation, it is necessary to set the electronic still camera again from the reproduction mode to the EE mode, making it extremely troublesome to shoot pictures and confirm them at the same time.

There is known a method of operating the electronic still camera in a predetermined manner so as to display information stored in a first memory unit temporarily storing image data for compression and recordal in a memory medium loaded in a secondary storage unit, but this method is for confirmation as to whether the still picture data had been suitably stored in the memory medium by the secondary storage unit, not the content of the still picture data recorded in the memory medium loaded in the secondary storage unit itself.

SUMMARY OF THE INVENTION

An object of the present invention is to provide an electronic still camera which enables reduction of the troublesome operation of the electronic still camera when shooting pictures while confirming the images recorded in a memory medium by a secondary recording unit.

Another object of the present invention is to provide an electric still camera which enables confirmation of the still picture data recorded in the memory medium loaded in the secondary storage unit itself.

Still another object of the present invention is to provide a method for displaying the images of the same.

In an electric still camera according to the present invention, a shutter button is arranged to be depressed to two levels. When pushed all the way in, the camera takes a picture of the object, while when pushed halfway and held in that state for a predetermined time, the last shot picture is read out from a memory shown on a display unit. In other cases, the image of an object is shown on the display unit in its original state. By this, it is possible to operate the shutter during picture taking and to check the content of the still picture data recorded just by the operation of the shutter button.

According to the present invention, there is provided an electronic still camera including: an image forming unit for forming an image of an object to be photographed and providing an electrical picture signal; a shutter for allowing light of the object to reach the image forming unit; a display unit for displaying a picture and/or information such as an operation mode of the camera; a mode setting switch for setting an operation mode including an EE mode; a first switching device having at least first and second contacts, the contacts being selectively energized; a picture data recording and reproducing unit including a memory for recording the picture data on the memory and reproducing the same; a second switching circuit, operatively connected among the image forming unit, the picture data recording and reproducing unit and the display unit, for selectively outputting the picture signal from the image forming unit or the reproduced picture signal from the picture data recording and reproducing unit to the display unit; and a control unit for controlling the shutter in response to the second contact of the first switching device, the second switching circuit in response to the first contact of the first switching device and/or the mode setting switch, and the picture data recording and reproducing unit. While the EE mode is set to continuously display the picture signal on the display unit through the second switching circuit, (a) the control unit energizes the shutter and the picture data recording and reproducing unit to take a picture of the object and record the picture data on the memory in the picture data recording and reproducing unit, when the second contact of the first switching device is energized, and (b) the control unit energizes the second switching circuit and the picture data recording and reproducing unit to reproduce the picture data recorded in the memory and display it on the display unit, when the first contact of the first switching device is energized and the energization is continued for a predetermined time.

The picture data recording and reproducing unit continuously records the picture signal in the memory in response to the energization from the control unit on the basis of the energization of the second contact of the first switching device.

Also, the control unit continues the energization of the picture data recording and reproducing unit to successively display the picture data recorded in the memory while the first contact of the first switching device is energized.

Preferably, the first switching device comprises a two-level pushbutton switch wherein the first contact is energized when the pushbutton it is pushed halfway and the second contact is energized when it is pushed all the way.

The picture data to be recorded in the memory is compressed and recorded in the memory, and the picture data to be displayed on the display unit and recorded in the memory is expanded before the display on the display unit.

Also, according the present invention, there is provided a method of processing picture data, including the steps of: forming image data of an object; displaying the image data as a picture on a display unit; recording the image data in a memory in response to a first switching operation; and reproducing and displaying the image data recorded in the memory on the display unit in response to a second switching operation.

The first switching operation and the second switching operation are carried out by using a two-level pushbutton, the second switching operation being made when the pushbutton is pushed halfway, and the first switching operation being made when the pushbutton is pushed all the way.

Further, according to the present invention, there is provided a camera including: an image forming unit for forming an image of an object to be photographed and providing an electrical picture signal; a display unit for displaying a picture and/or information such as an operation mode of the camera; a mode setting device for setting an operation mode including an EE mode; a first switching device having at least first and second contacts, the contacts being selectively energized; a picture data recording and reproducing unit including a memory, for recording said picture data on the memory and reproducing the same; a second switching circuit, operatively connected among the image forming unit, the picture data recording and reproducing unit and the display unit, for selectively outputting the picture signal from the image forming unit or the reproduced picture signal from the picture data recording and reproducing unit to the display unit; and a control unit for controlling the second switching circuit in response to the first contact of the first switching device and/or the mode setting device, and the picture data recording and reproducing unit. While the EE mode is set to continuously display the picture signal on the display unit through the second switching circuit, (a) the control unit energizes the picture data recording and reproducing unit to record the picture data on the memory in the picture data recording and reproducing unit, when the second contact of the first switching device is energized, and (b) the control unit energizes the second switching circuit and the picture data recording and reproducing unit to reproduce the picture data recorded in the memory and display it on the display unit, when the first contact of the first switching device is energized and the energization is continued for a predetermined time.

The first switching device comprises a two-level pushbutton switch wherein the first contact is energized when the pushbutton is pushed halfway and the second contact is energized when it is pushed all the way.

BRIEF DESCRIPTION OF THE DRAWINGS

The above objects and features and other objects and features of the present invention will be described in more detail with reference to the accompanying drawings, in which.

DESCRIPTION OF THE PREFERRED EMBODIMENTS

Below, the electronic still camera of the present invention will be explained with reference to an embodiment.

Figure 1:
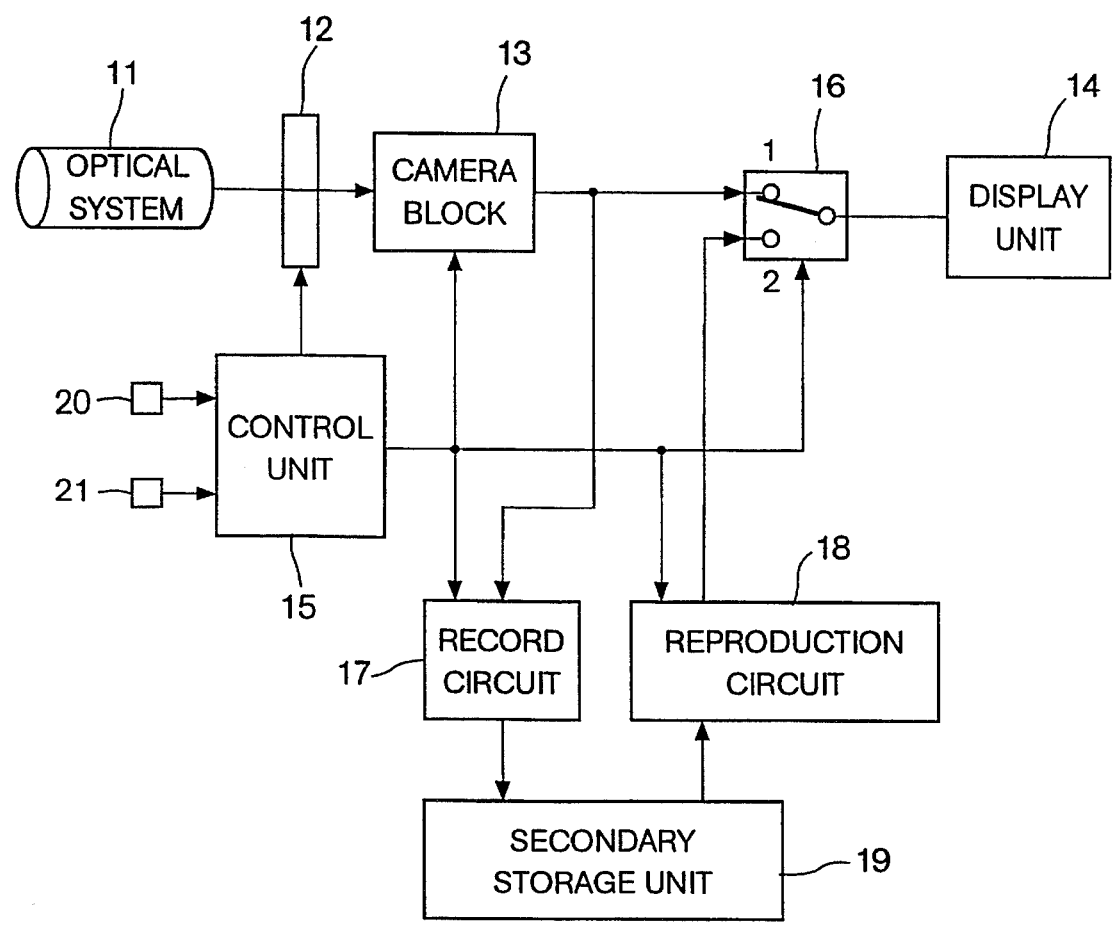
FIG. 1 is a block schematic diagram showing the construction of an electronic still camera of the present invention.

FIG. 1 is a view of the configuration of an electronic still camera as an embodiment in accordance with the present invention.

An electronic still camera 1 of the present invention includes an optical system 11 including a focusing lens, other lenses and a stop, a shutter unit 12, a camera block 13, a display unit 14, a control unit 15, a changeover switch 16, a recording circuit 17, a reproduction circuit 18, a secondary storage unit 19, a shutter switch (release button) 20, and a mode setting unit (switch) 21.

The control unit 15 is comprises a one-chip microprocessor (µP), an inner memory (not shown) such as RAM functioning as a first memory for temporarily storing raw image data and storing various data, and its peripheral circuits (not shown). The secondary storage unit 19 is provided with a memory medium (not shown) for storing picture data. Preferably, the memory medium is a portable and detachable memory such as a memory card, an IC memory card having a memory, or a floppy disk. The memory medium is loaded in the secondary storage unit 19 when the data is recorded thereto and read therefrom, and the memory medium is removed from the second storage unit 19 and loaded in another electronic still camera or picture reproduction apparatuses to reproduce the picture data recorded thereon. Therefore, the memory medium is called an external memory medium.

The electronic still camera 1 of the present invention uses the shutter switch 20, used for operating the shutter at the time of shooting a picture, of a type which is depressed in two levels (steps). In the EE mode, when the shutter button 20 is pushed in all the way (pushed to second level), the shutter is operated and the object in question is photographed. When pushed in halfway after the shooting (pushed to first level), after a predetermined time passes, a review mode is entered and the data obtained just previously and recorded in the memory medium by the secondary storage unit 19 is reproduced and shown on the display unit 14.

In FIG. 1, the optical system 11 is comprised of an aperture, lens, etc. The image of the object is formed on the imaging device such as a charge coupled device (CDD) of the camera block 13.

The shutter unit 12 is controlled by a control unit 15 and operates the shutter.

The camera block 13 is controlled by the control unit 15 and is comprised of a CCD or other imaging device and its peripheral circuits. The image of the object formed on the imaging device by the optical system 11 is converted to electrical signals and input to the display unit 14 through the recording circuit 17 and the changeover switch 16.

The display unit 14 is comprised of a small-sized CRT or liquid crystal display (LCD) and shows the image from the camera block 13 input through the reproduction circuit 18 or the changeover switch 16.

The control unit 15 controls the electronic still camera 1 as a whole.

The changeover switch 16 is controlled by the control unit 15 and selects the image signals input to the display unit 14. Here, in the EE mode, the changeover switch 16 connects the display unit 14 and the first contact and in the reproduction mode and the review mode connects the display unit 14 and the second contact.

The recording circuit 17 is controlled by the control unit 15 and converts the image signals of the analog format, obtained by conversion at the camera block 13, into signals of a digital format (A/D conversion), compresses them by performing discrete cosine transformation (DCT), run length limitation control, etc., and inputs the result as digital still picture data in the memory medium loaded in the secondary storage unit 19.

The reproduction circuit 18 is controlled by the control unit 15 and expands the digital still picture data recorded in the memory medium loaded in the secondary storage unit 19 by performing inverse discrete cosine transformation (IDCT), run length expansion control, etc. and inputs the result as picture signals of an analog format through the changeover switch 16 to the display unit 14.

The secondary storage unit 19 is controlled by the control device 15 and, for example, uses an IC memory card or a magnetic disk or other nonvolatile storage medium so as to record several pictures worth of digital still picture data input from the recording circuit 17, reproduce it, and input it to the reproduction circuit 18.

The shutter switch 20 is a pushbutton switch which can be pushed to two levels. Information on which level it has been pushed to is input to the control unit 15. The control unit 15 controls the various components based on this information.

Here, when the shutter button 20 is pushed to the second level, a picture is taken. That is, under the control of the control unit 15, the shutter is operated by the shutter unit 12, the image is converted to picture signals by the camera block 13, the picture signals are compressed by the recording circuit 17, the signals are converted to a digital format, and the digital still picture data is recorded in the IC memory card loaded in the secondary storage unit 19.

Further, when the shutter button 20 continues to be pushed after the picture is taken, and is kept depressed at the first level for more than a predetermined time, the control unit 15 exercises control so that the changeover switch 16 is connected to the second contact side, whereby the digital still picture data recorded in the IC memory card loaded in the secondary storage unit 19 is expanded and output to the display unit 14 to be shown.

The mode setting unit 21 is comprised of switches etc. These switches are operated to make the various settings, such as the mode, for the electronic still camera 1.

The setting information input by the switches of the mode setting unit 21 is input to the control unit 15 which then controls the various components of the electronic still camera 1.

The components of the electronic still camera 1 are accommodated in a single body to form a one-piece camera for taking still pictures.

Below, an explanation will be made of the operation in the case of using the electronic still camera 1 to take a picture of an object while checking on the content of the still picture data recorded in the IC memory card loaded in the secondary storage unit 19.

First, the user of the electronic still camera 1 sets the electronic still camera 1 to the EE mode by setting the mode setting unit 21.

In the EE mode, the image of the object is formed on the imaging device such as a CDD (not shown) in the camera block 13 through the optical system 11. The image of the object is converted to electrical signals in the camera block 13 and is shown on the display unit 14 through a changeover switch 16.

Here, the changeover switch 16 selects the second contact side as mentioned earlier. The pictures are shown successively for short times on the display unit 14 and are perceived by the user viewing them to be moving pictures.

In the EE mode, when the user decides on the composition of the object while viewing the pictures shown on the display unit 14, he pushes the shutter button 20 to the second level.

The information that the shutter button 20 has been pushed down to the second level is input to the control unit 15, whereupon the control unit 15 controls the shutter unit 12 to operate the shutter. Further, it controls the camera block 13, the recording circuit 17, and the secondary storage unit 19, converts the image of the object to an electrical signal, converts this further to data of a digital format, preferably, compresses it, and records the result as the still picture data in the IC memory card by the secondary storage unit 19. When the user subsequently releases the shutter button 20, information that the mode setting unit 21 has stopped being pushed is input to the control unit 15. Based on this information, the control unit 15 controls the various components so that the electronic still camera 1 operates in the EE mode.

On the other hand, when the shutter button 20 is pushed down to the first level after shooting a picture, information that the shutter button 20 has been pushed down to the first level is input to the control unit 15. Based on this information, the control unit 15 controls the components so that the electronic still camera 1 continues operating in the EE mode for a predetermined period after the shutter button 20 started to be pushed to the first level.

When, after the button has been pushed to the second level, this pushing action of the shutter button 20 to the first level may be a new pushing action after the button is once released or may be a shift to the first level without releasing the button.

When the shutter button 20 is pushed down to the first level continuously for more than a predetermined period, for example, 2 seconds, the control unit 14 sets the electronic still camera 1 to the review mode. Due to the control of the control unit 15, the changeover switch 16 is connected to the second contact side, the still picture data last recorded in the IC memory card loaded in the secondary storage unit 19 is read out and expanded by the reproduction circuit 18, and the still picture is shown on the display unit 14. The still picture continues to be displayed until the shutter button 20 stops being pushed down.

After the still picture is checked, the user stops pushing down the shutter button 20. Information that the shutter button 20 has stopped being pushed down is input to the control unit 15, whereupon the control unit 15 controls the electronic still camera 1 based on that information and returns the electronic still camera 1 to the EE mode. This ends the operation when using the electronic still camera 1 to take pictures of objects while checking the content of the still picture data recorded in the IC memory card loaded in the secondary storage unit 19.

As explained above, by taking pictures while checking the still picture data recorded in the IC memory card loaded in the secondary storage unit 19, it is possible to check on the content of the still picture data itself recorded in the IC memory card loaded in the secondary storage unit 19. Also, the only thing required to operate the electronic still camera 1 for checking the data is to push the shutter button 20 to the first level, so there is no need for operating the mode setting unit 21 to set the electronic still camera 1 to the reproduction mode each time a check is made and therefore confirmation of the data requires almost no trouble.

Figure 2:
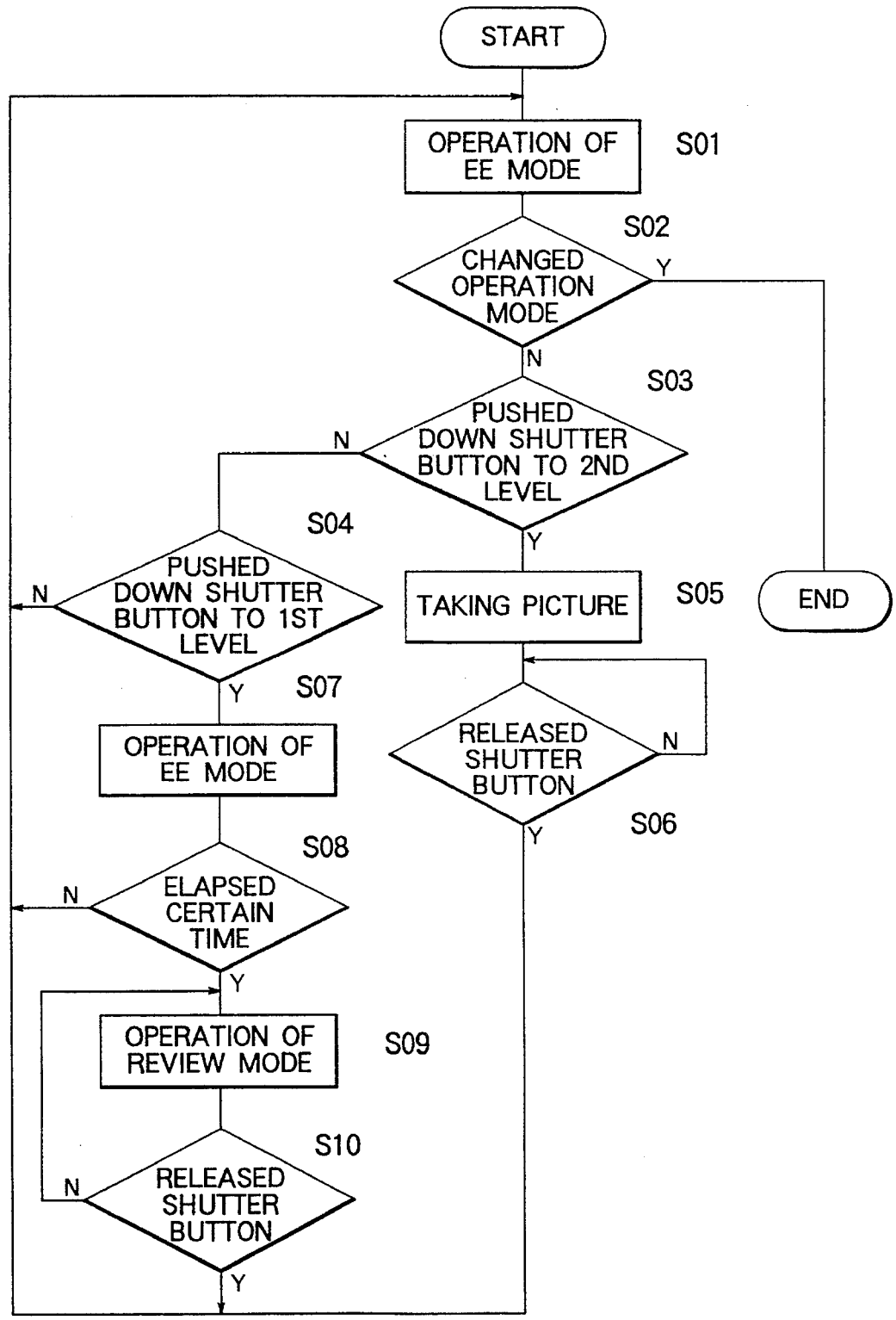
FIG. 2 is a flow chart showing an operation of the electronic still camera shown in FIG. 1.

FIG. 2 is a flow chart showing an example of the processing of the control unit 15 in the case of using the electronic still camera 1 to take a picture of an object while checking on the content of the still picture data recorded in the IC memory card loaded in the secondary recording unit 19.

At step 01 (S01), the electronic still camera 1 is set to the EE mode and performs the above-mentioned EE mode operation.

At step 02 (S02), the control unit 15 determines whether or not there has been any change in the setting by the mode setting unit 21. If a change has been made, it ends the EE mode processing and performs the processing of the other mode. If no change has been made, the control unit 14 maintains the EE mode processing.

At step 03 (S03), the control unit 15 determines whether or not the shutter button 20 has been pushed down to the second level. If the shutter button 20 has been pushed down to the second level, the control unit 15 advances to the processing of S05. If it has not been pushed there, the control unit 15 advances to the processing of S04.

At step 04 (S04), the control unit 15 determines whether or not the shutter button 20 has been pushed down to the first level. If the shutter button 20 has been pushed down to the first level, the control unit 15 advances to the processing of S07. If it has not been pushed there, that is, if the shutter button 20 has not been pushed down, the control unit 15 returns to the processing of S01.

At step 05 (S05), the control unit 15 controls the components of the electronic still camera 1 and takes a picture of the object to be photographed as a still picture.

At step 06 (S06), the control unit 15 determines whether or not the shutter button 20 has finished being pushed down to the second level. If the shutter button 20 has not finished been pushed down to the second level, the control unit 15 repeats its determination (judgement). If it has finished, the control unit 15 returns to the processing of S01.

At step 07 (S07), the control unit 15 performs the signal processing at the EE mode.

At step 08 (S08), the control unit 15 determines whether or not a predetermined time has elapsed from the state of depression of the shutter button 20 to the first level. After that time has elapsed, the control unit 15 proceeds to the processing of S09. When it has not elapsed, the processing of the control unit 15 is repeated.

At step 09 (S09), the control unit 15 performs the above-mentioned review mode processing.

At step 10 (S10), the control unit 15 determines whether or not the shutter button 20 has finished being pushed. When it has not finished being pushed, the control unit 15 repeats the processing. When it has been finished, the control unit 15 continues the processing of S09.

The processing is ended by the above.

In this embodiment, even if the shutter button 20 is pushed to the second level during the review mode, the camera would not take a picture of the object, but it is also possible to make the camera take a picture in that case.

Further, it is also possible to have the review mode operation performed by a similar operation in the case of modes other than the EE mode.

Also, in this embodiment, data of a digital format is recorded in the IC memory card loaded in the secondary storage unit 19, but the IC memory card in the secondary storage unit 19 may also be made to record data of an analog format and other parts may be combined with this.

In addition, the IC memory card used here as the secondary storage medium may be changed to a RAM or other volatile recording device when for example battery backup in the electronic still camera 1 is ensured.

In addition to the above, the electronic still camera of the present invention may be modified in various ways such as making the display unit a separate element. The embodiment mentioned above was merely illustrative.

As explained above, according to the present invention, it is possible to provide an electronic still camera which can eliminate the trouble of operating the electronic still camera when taking pictures while checking the images recorded in the secondary storage medium and which allows checking of the content of the still picture data recorded in the secondary storage medium itself and also a method for display of the images thereof.

The application of the present invention is not limited to the electronic still camera, and the present invention can be applied to other cameras such as video tape recorder cameras wherein a record of a substantial still view is required.

What is claimed is:

1. An electronic still camera comprising:

an image forming means for forming an image of an object to be photographed and providing an electrical picture signal;

a shutter means for allowing light of said object to reach said image forming means;

a display means for displaying a picture and/or information such as an operation mode of the camera;

a mode setting means for setting an operation mode including an EE mode;

a first switching means having at least first and second contacts, the contacts being selectively energized;

a picture data recording and reproducing means including a memory, for recording said picture signal from said image forming means in said memory as picture data and reproducing the same;

a second switching means, operatively connected to said image forming means, said picture data recording and reproducing means, and said display means, for selectively outputting said picture signal from said image forming means or said reproduced picture data from said picture data recording and reproducing means to said display means; and a control means responsive to said first switching means and said mode setting means, and being operatively connected to said second switching means, said shutter means, and said picture data recording and reproducing means, for controlling said shutter means in response to said second contact of said first switching means, and for controlling said second switching means in response to said first contact of said first switching means and/or said mode setting means, and for controlling said picture data recording and reproducing means, wherein during operation, a) said control means energizes said image forming means to continuously display said picture signal from said image forming means on said display means through said second switching means, when said mode setting means is set to said EE mode and said first and second contacts of said first switching means are not energized, b) said control means energizes said shutter means and said picture data recording and reproducing means to take a picture of said object and record the picture signal in said memory in said picture data recording and reproducing means as said picture data, when said second contact of said first switching means is energized, and c) said control means energizes said second switching means and said picture data recording and reproducing means to reproduce said picture data recorded in said memory and display it on said display means, when said first contact of said first switching means is energized and the energization is continued for a predetermined time.

2. An electronic still camera according to claim 1, wherein said picture data recording and reproducing means continuously records said picture signal in said memory in response to continuous energization from said control means on the basis of said energization of said second contact of said first switching means.

3. An electronic still camera according to claim 2, wherein said control means continues said energization of said picture data recording and reproducing means to successively display said picture data recorded in said memory while said first contact of said first switching means is energized.

4. An electronic still camera according to claim 1, wherein said first switching means comprises a two-level pushbutton switch wherein said first contact is energized when the pushbutton is pushed halfway and said second contact is energized when it is pushed all the way.

5. An electronic still camera according to claim 1, wherein said picture data to be recorded in said memory is compressed and recorded in said memory.

6. An electronic still camera according to claim 5, wherein said picture data to be displayed on said display means and recorded in said memory is expanded before the display on said display means.

7. A camera comprising:

an image forming means for forming an image of an object to be photographed and providing an electrical picture signal;

a display means for displaying a picture and/or information such as an operation mode of the camera;

a mode setting means for setting an operation mode including an EE mode;

a first switching means having at least first and second contacts, the contacts being selectively energized;

a picture data recording and reproducing means including a memory, for recording said picture signal from said image forming means in said memory as picture data and reproducing the same;

a second switching means, operatively connected to said image forming means, said picture data recording and reproducing means, and said display means, for selectively outputting said picture signal from said image forming means or said reproduced picture data from said picture data recording and reproducing means to said display means; and a control means responsive to said first switching means and said mode setting means, and being operatively connected to said second switching means and said picture data recording and reproducing means, for controlling said second switching means in response to said first contact of said first switching means and/or said mode setting means, and for controlling said picture data recording and reproducing means, wherein during operation, a) said control means energizes said image forming means to continuously display said picture signal from said image forming means on said display means through said second switching means, when said mode setting means is set to said EE mode and said first and second contacts of said first switching means are not energized, b) said control means energizes said picture data recording and reproducing means to record the picture signal on said memory in said picture data recording and reproducing means as said picture data, when said second contact of said first switching means is energized, and c) said control means energizes said second switching means and said picture data recording and reproducing means to reproduce said picture data recorded in said memory and display it on said display means, when said first contact of said first switching means is energized and the energization is continued for a predetermined time.

8. A camera according to claim 7, wherein said picture data recording and reproducing means continuously records said picture signal in said memory in response to continuous energization from said control means on the basis of said energization of said second contact of said first switching means.

9. A camera according to claim 8, wherein said control means continues said energization of said picture data recording and reproducing means to successively display said picture data recorded in said memory while said first contact of said first switching means is energized.

10. A camera according to claim 7, wherein said first switching means comprises a two-level pushbutton switch wherein said first contact is energized when the pushbutton is pushed halfway and said second contact is energized when it is pushed all the way.

11. An electronic still camera comprising:

an image forming means for forming an image of an object to be photographed and providing an electrical picture signal;

a shutter means for allowing light of said object to reach said image forming means;

a display means for displaying a picture and/or information such as an operation mode of the camera;

a mode setting switch to set an operation mode including an EE mode;

a two-level pushbutton switch having a first contact that is energized when the pushbutton is pushed halfway and a second contact that is energized when said pushbutton is pushed all the way, a picture data recording and reproducing means including a memory, for recording said picture signal from said image forming means in said memory as picture data and reproducing the same;

a switching means, operatively connected to said image forming means, said picture data recording and reproducing means, and said display means, for selectively outputting said picture signal from said image forming means or said reproduced picture data from said picture data recording and reproducing means to said display means; and a control means responsive to said mode setting switch and said pushbutton switch, and being operatively connected to said switching means, said shutter means, and said picture data recording and reproducing means, for controlling said shutter means in response to said second contact of said pushbutton switch, and for controlling said switching means in response to said first contact of said pushbutton switch and/or said mode setting switch, and for controlling said picture data recording and reproducing means, wherein during operation, a) said control means energizes said image forming means to continuously display said picture signal from said image forming means on said display means through said switching means, when said mode setting means is set to said EE mode and said first and second contacts of said pushbutton switch are not energized, b) said control means energizes said shutter means and said picture data recording and reproducing means to take a picture of said object and record the picture signal on said memory in said picture data recording and reproducing means as said picture data, when said second contact of said pushbutton switch is energized, c) said control means energizes said switching means and said picture data recording and reproducing means to reproduce said picture data recorded in said memory and display it on said display means, when said first contact of said pushbutton is energized and the energization is continued for a predetermined time, d) said control means controls said picture data recording and reproducing means to continuously record said picture signal in said memory in response to continuous energization of said second contact of said pushbutton switch, and e) said control means continues said energization of said picture data recording and reproducing means to successively display said picture data recorded in said memory while said first contact of said pushbutton switch is energized.

12. An electronic still camera according to claim 11, wherein said picture data to be recorded in said memory is compressed and recorded in said memory.

13. An electronic still camera according to claim 12, wherein said picture data to be displayed on said display means and recorded in said memory is expanded before the display on said display means.

* * * * *